Jan. 16, 1940.  A. A. LANE ET AL  2,187,658
AMPHIBIAN VEHICLE
Filed Nov. 3, 1937  8 Sheets-Sheet 1

Inventors
Abbot A. Lane
Eugene W. Jacobson
By A. M. Houghton
Their Attorney Jan. 16, 1940.  A. A. LANE ET AL  2,187,658
AMPHIBIAN VEHICLE
Filed Nov. 3, 1937  8 Sheets-Sheet 5

Inventors
Abbot A. Lane
Eugene W. Jacobson
By G. M. Houghton
their Attorney Jan. 16, 1940.  A. A. LANE ET AL  2,187,658
AMPHIBIAN VEHICLE
Filed Nov. 3, 1937   8 Sheets-Sheet 8

Inventors
Abbot A. Lane
Eugene W. Jacobson their Attorney

Patented Jan. 16, 1940

2,187,658

UNITED STATES PATENT OFFICE 2,187,658

AMPHIBIAN VEHICLE

Abbot A. Lane, Aspinwall, and Eugene W. Jacobson, Oakmont, Pa., assignors to Gulf Research & Development Company, Pittsburgh, Pa., a corporation of Delaware Application November 3, 1937, Serial No. 172,642

7 Claims. (Cl. 115—1)

This invention or discovery relates to amphibian vehicles; and it comprises a power-driven vehicle adapted for travel in marshes as well as on open water and solid ground, and comprising a frame, buoyant pneumatic tired traction wheels at least ten feet in diameter, means for mounting the wheels in close-coupled relation fore and aft on the frame, said means being so constructed and arranged that the axis joining the centers of the front wheels can twist in a vertical plane with respect to the axis joining the centers of the rear pair of wheels, power means for driving all four wheels and means for steering at least one pair of wheels, the wheels having such buoyancy as to float the vehicle in water with the wheels immersed approximately one-fourth of their diameter, the center of gravity of the vehicle being substantially at the center of the frame and at the level of the wheel centers, and the wheel base being not much greater than the diameter of the wheels, all as more fully hereinafter set forth and as claimed.

In certain undertakings, such as geophysical prospecting, there is a desideratum for a vehicle capable of traveling, while carrying a useful load, over very soft and treacherous ground, including swamps and marshes, which usually have stretches of open water of various depth. In the delta of the Mississippi, where salt domes occur, sometimes associated with oil, there are many thousands of square miles of this kind of territory, overgrown with heavy vegetation, which are substantially inaccessible; which cannot be entered either on foot or by boat. Land vehicles are useless. The soft mud is practically bottomless; it offers no footing on which even a caterpillar tractor can travel. Much of this territory is unexplored; probably has never even been entered.

According to the present invention we provide a power driven vehicle capable of carrying a prospecting crew and instruments and of such a character that it will travel with preservation of good clearance and a high working level irrespective of whether the passage of the vehicle happens momentarily to be over mud, water or land. To this end we provide a vehicle with four or more resilient flotation wheels of sufficiently large diameter to make ascent of banks easy. Wheels on opposite sides are arranged for independent driving, to facilitate turning in water and maneuvering. Ordinarily, the wheels are at least 10 feet in diameter and are rubber-tired. The superstructure is of light construction to preserve the center of gravity near the hubs. The vehicle is massive enough to crush down all ordinary vegetation, cane, grass, brush, etc. The wheels have a buoyant central portion and a buoyant pneumatic tire. All four wheels are driven. The wheels, which are in effect rotary hulls, are mounted about at the corners of a square, and as close together fore and aft as is conveniently practicable; for reasons set forth subsequently. The front wheels are mounted on a pivoted axle. The wheels have sufficient buoyancy so as to support the vehicle while immersed to about one-fourth their diameter in water. That is, when the vehicle is in open water, the vehicle sinks half way to the hubs. On a more solid footing the working level is higher but there is only slight sinking of the vehicle as a whole in passing from solid land to water. In either case there is enough clearance to prevent difficulty with rank vegetation growing at the water's edge, or with logs and stumps. The center of gravity of the vehicle is made substantially at the center of the square, or a little ahead of the center, and at the level of the wheel centers, it having been discovered that this is necessary in securing a seaworthy vehicle capable of navigating water and marshes with safety; and in particular capable of going from water to land and vice versa which is a surprisingly difficult maneuver, on account of a tendency for the end of the vehicle which is immersed in water to sink, as the end which is climbing out on land rises, and also because of the common occurrence in marshes of dense, high vegetation growing right to the water's edge. Accordingly we provide high body clearance to overcome the resistance of such vegetation.

The vehicle constructed according to these principles is, as a matter of fact, admirably adapted for traversing treacherous ground of all sorts, as well as land and water and is in particular suited for swamps having slimy mud, rank vegetation, fallen logs and the like which would be insuperable obstacles to any known type of vehicle. Where there is practically no footing, as in "floating prairie", only the present large buoyant-wheeled vehicle affords the right combination of traction, flotation, body clearance and low unit supporting pressure, to come out of deep water or soft bottomless mud into the tall grass.

In the accompanying drawings there is shown, more or less diagrammatically, an example of a specific embodiment of a vehicle within the purview of the invention. In the showings.

Figure 3:
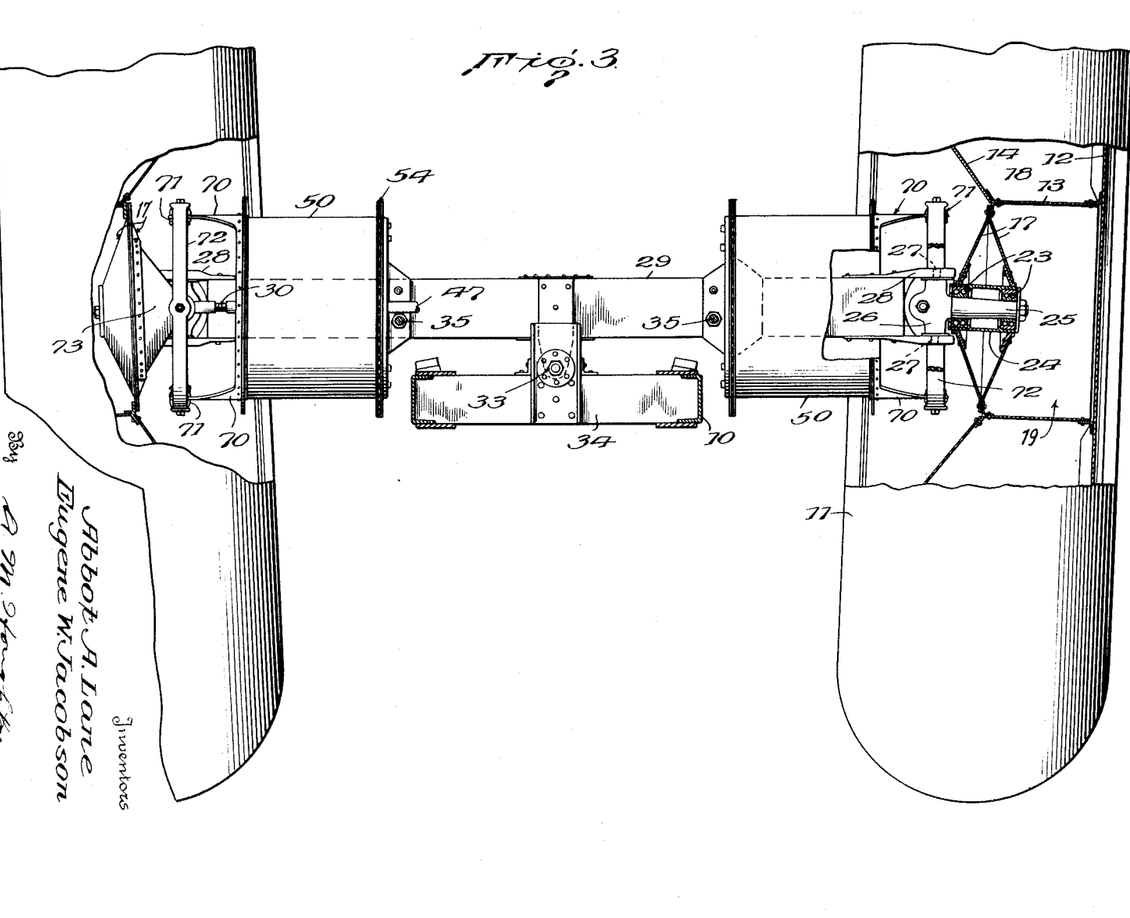
Fig. 3 is a view in end elevation, with some parts broken away, of the front axle assembly.
Figure 12:
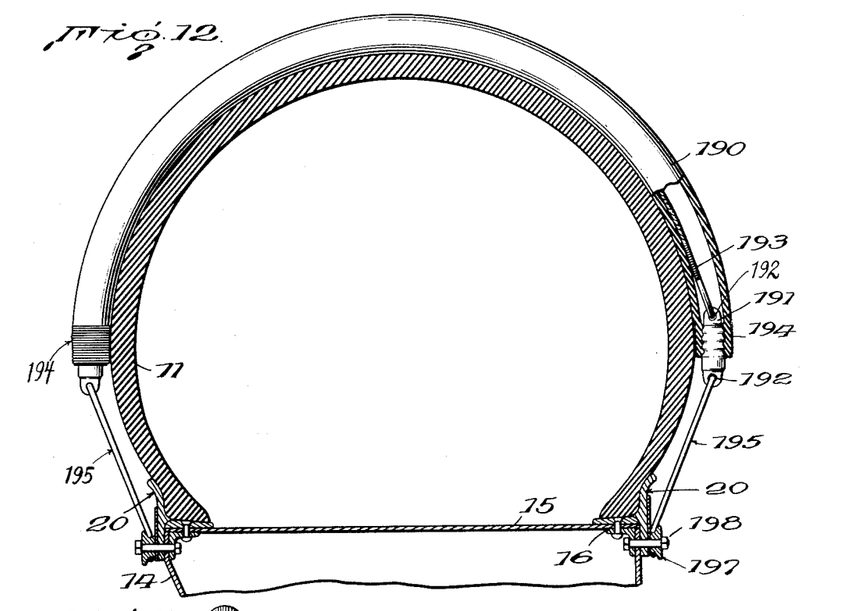
Fig. 12 is a view of the detachable treads attached to a wheel.

Referring to the showings, the vehicle comprises a longitudinally extending frame 10, advantageously of channel steel or light metal alloy, with wheels having pneumatic tires 11 mounted thereon as later described. As shown, four wheels are provided spaced fore and aft as closely as can conveniently be provided. The front wheels and axle are shown most clearly in Fig. 3. Each wheel comprises an outer disc-like member 12 attached to a drum 13 and an inner frusto-conical member 14 likewise attached to drum 13. Members 12 and 14 are attached to a cylindrical member 15, by an annulus 16, as shown in Fig. 12. The inner end of cylinder 13 is closed by a double cone hub 17 as shown in Fig. 3. All the joints are made water-tight, so that there is defined an annular space 18 between members 12, 13, 14 and 15; and a cylindrical space 19 defined by elements 12, 13 and 17; which spaces provide buoyancy. The buoyancy of these chambers is sufficient to float the entire vehicle even without pneumatic tires, thus the vehicle will still float should the tires become deflated. However, tires are provided to secure additional buoyancy, to provide cushioning and to aid in traction. The tires 11 are retained to the wheels by a pair of rims 20 (Figs. 12 and 13) and advantageously contain a pneumatic inner tube (not shown) of generally conventional type, though buoyancy can be obtained in other ways as by a kapok filling, etc. The over-all diameter of the tires should be at least 10 feet and the diameter is conveniently about 2.5 feet. The tires are kept inflated to a few pounds pressure.

Figure 1:
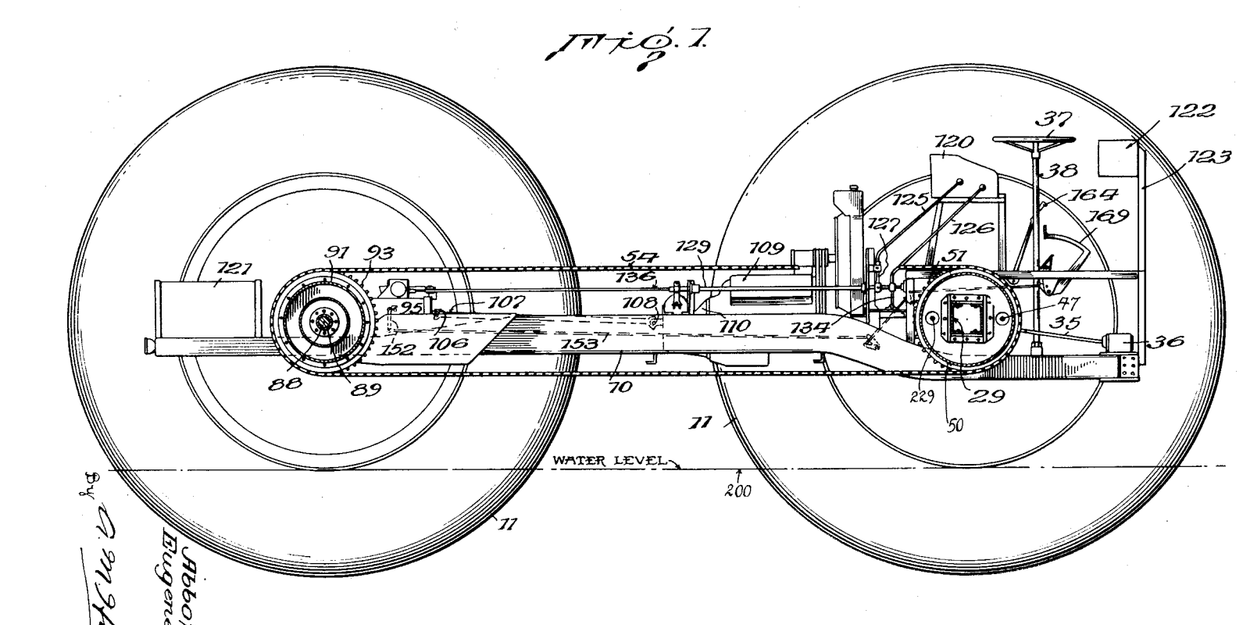
Fig. 1 is a view partly in elevation and partly in vertical section of the vehicle, the view being taken along line I—I of Fig. 2.

Each front wheel is mounted for rotation by means of a pair of bearings 23 retained by a housing 24 in the double cone 17, and engaging a stub shaft 25 which is part of a steering knuckle 26. The steering knuckle is mounted for rotation by pins 27 in two lugs 28 attached to each end of a dead front axle 29, advantageously of tubular structure as shown (Fig. 1). The steering knuckles are joined by a tie bar 229 (Figs. 4 and 9) at the rear of the front axle and having a screw adjustment 30 for length and pivotally attached to each end as indicated at 31 to projection 32 on the steering knuckles. The front axle is pivoted at 33 to a cross-member 34 on frame 10 and is kept in alignment while being free to swing in a vertical plane by a pair of radius rods 35 flexibly attached to the frame at 36 (Fig. 1).

Figure 9:
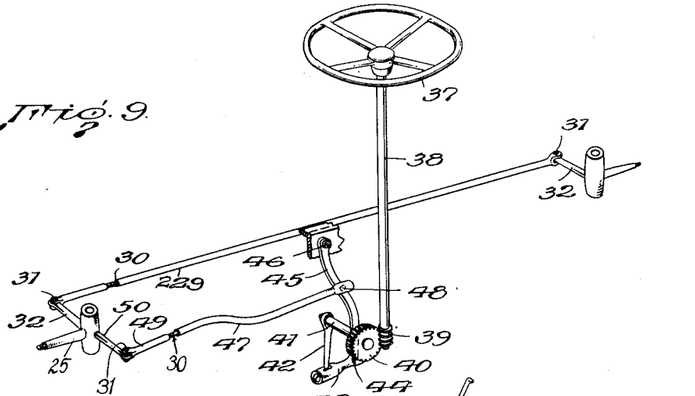
Fig. 9 is a diagrammatic showing of the steering gear.

The steering gear for the front wheels is illustrated diagrammatically in Fig. 9. It comprises a steering wheel 37 on a shaft 38 having a worm 39 engaging a gear 40 on a shaft 41. Shaft 41 has an arm 42 pivotally engaging a link 43 pivotally attached at 44 to a lever 45 pivoted to a portion of the vehicle frame at 46. A drag link 47 is pivotally attached at 48 to an intermediate point on the lever and is connected by a member 49 and a pivot 31 with a projection 50 on one of the steering knuckles. The operation of the steering gear is evident from Fig. 9. The purpose of the auxiliary lever 45 is to secure an increased turning effort on the wheels.

The front wheels are driven, which necessitates provision of a universal joint. The driving mechanism of the front wheels appears in detail in Figs. 3, 4 and 5.

Figure 4:
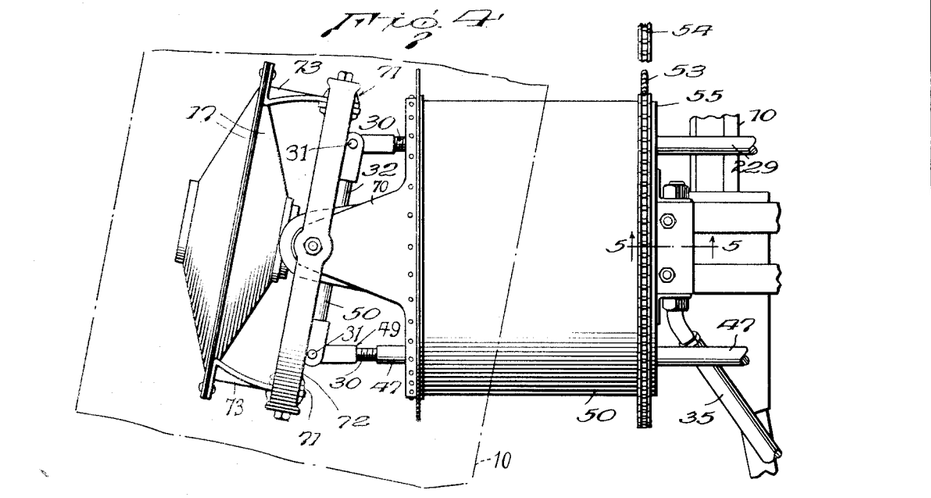
Fig. 4 is a detail plan view of portions of the front axle assembly.
Figure 5:
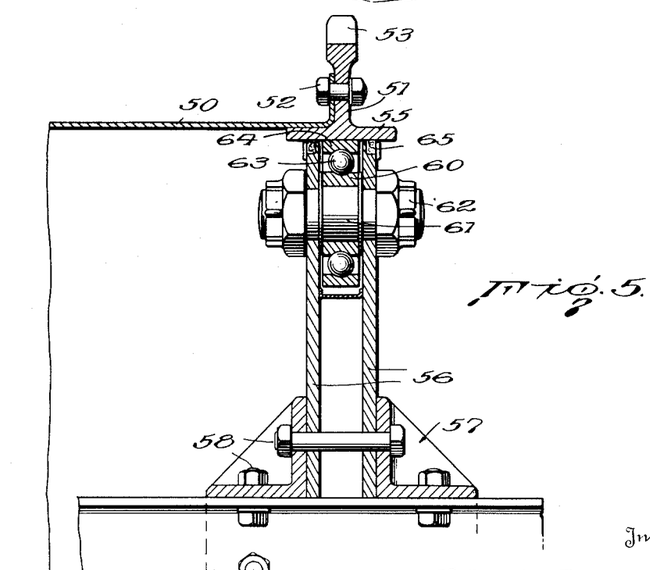
Fig. 5 is a view in vertical section of a portion of the front axle assembly.

At each end of the front axle is a driving drum 50, attached to an annular sprocket wheel 51 (Figs. 1 and 5), by bolts 52, the sprocket wheel having sprocket teeth 53 for engagement with a sprocket chain 54 extending to the rear wheels. The sprocket wheel has a flange-like rim 55. Mounted on the dead axle is a pair of discs 56, attached by angle pieces 57 and bolts 58, and having mounted around its periphery a plurality of ball-bearing wheels, each comprising a stationary race 60 attached to a pin 61 bolted to the discs by nuts 62 and having a set of balls 63 and a rotary outer race 64. Only one of the ball bearing wheels appears in Fig. 5. An annular seal indicated at 65 is provided to protect the bearing from water. The outer end of each driving drum 50 has a diametrically opposed pair of lugs 70 attached by flexible joints 71 to an annulus 72 at diametrically opposite points on the annulus. The annulus is attached, at two points at right-angles to bearings 71 to a pair of lugs 73 attached to the double cone 17. Flexible pivots 71 are provided for this connection. This arrangement of parts is shown in Figs. 3 and 4. It is apparent that lugs 70 and 73, in combination with annulus 72 form a universal joint, which permits the wheel to be rotated and twisted while being driven by the drum 50. In Fig. 4 the tire 10 is indicated in broken lines to show the orientation of the various parts.

Figure 6:
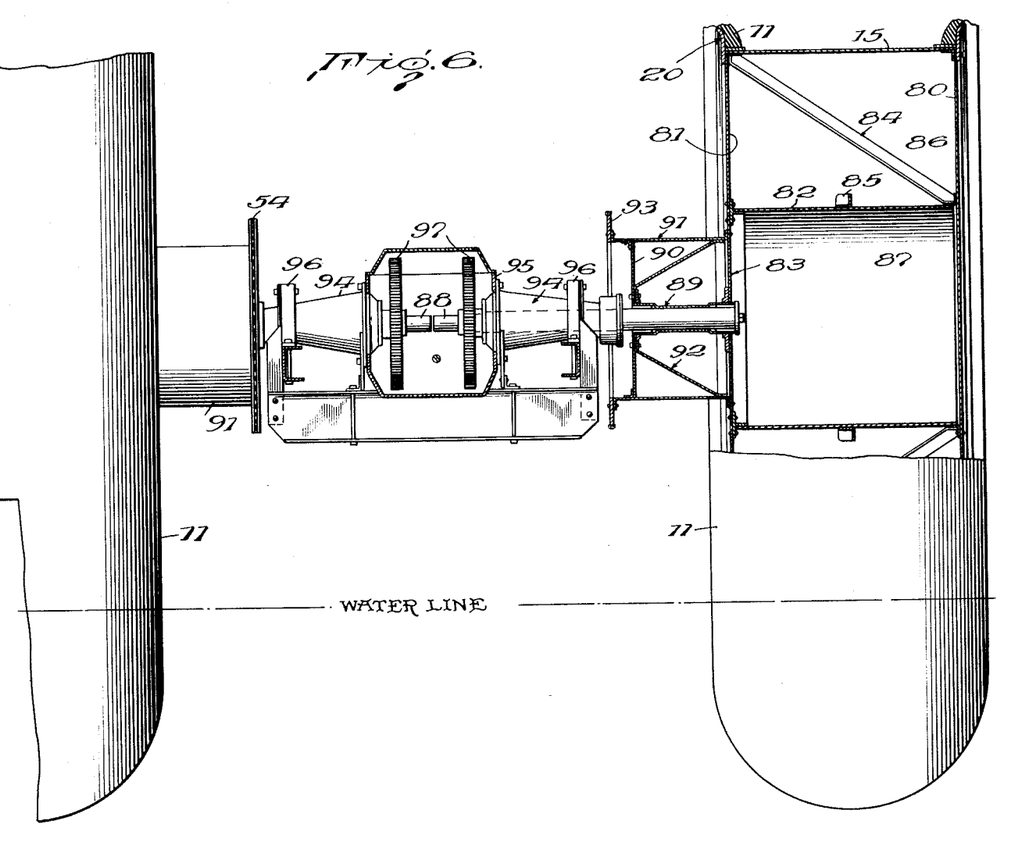
Fig. 6 is a rear elevation partly in vertical section, of the rear axle assembly.

The rear axle assembly will be next described. Referring to Fig. 6, each rear wheel comprises an outer cylindrical drum 15 as in the case of the front wheels and a pair of rims 20 for retaining the tire 11. Drum 15 is closed at the outer end by a disc 80 and at the inner end by an annular disc 81 attached to an inner drum 82. Drum 82 is closed at the outer end by the disc 80 and at the inner end by a hub plate 83. A series of struts 84 braces the interior of the wheel and an annular brace 85 is provided for drum 82. Buoyant chambers 86 and 87 exist within the wheel. The wheels are driven by a pair of live axles 88. The outer end of each axle is attached to a sleeve 89 which is fixed at one end to plate 83 and at the other end to a disc 90 attached to a driving drum 91 braced by a cone 92. The driving drum carries an annular sprocket wheel 93 which engages the drive chain 54 running to the front wheels (see Fig. 1). Upon rotation of the live axles the wheels and sprockets 93 are rotated. The live axles are mounted for rotation by known bearing means (not shown) in a pair of hollow dead axles 94 joined to a rear axle housing 95 (Fig. 7), supported on the frame by clamps 96. Each live axle has a spur gear wheel 97 engaging a pinion 98 mounted on a shaft 99 which shaft is mounted at the outer end in a bearing 100 for rotation with respect to housing 95. A differential gear assembly is provided consisting of a pair of bevel gears 101 mounted on the opposed ends of the shaft, and a plurality of bevel gears 102 mounted on stub shafts 103 for rotation in a housing 104, which housing rotates in a pair of stationary bearings 105. The housing is rotated by gearing (not shown) from a conventional transmission (not shown) in a housing 230 integral with housing 95. The operation of the differential gearing and reducing gears 97 and 98 is known per se and needs no description.

The multi-speed gear transmission in housing 230 is of conventional type and requires no description. It is driven through a universal joint 106 and propellor shaft 107 leading to a second universal joint 108 driven by a conventional internal combustion engine 109 having an integral clutch and transmission assembly in a housing 110.

Upon operation of the engine, the rear wheels are driven and power therefrom is transmitted to the front wheels as described. Should the drive chains break, the power supply to the rear wheels is not affected; the front wheels only go out of action.

To assist in turning the vehicle in open water, we find it advantageous to provide separate brakes for the rear wheels, so that a brake may be applied to the wheel on the side to which it is intended to turn. The brakes work on shafts 99 and are of conventional form. They comprise a brake drum 115 attached to shaft 99 as shown and engaging a pair of stationary internal brake shoes 116 adapted to be expanded by a cam 117 actuated by a lever arm 118. The brake linkage will be described below.

Referring again to Figs. 1 and 2 the engine is shown mounted somewhat ahead of the center to provide adequate carrying space toward the rear of the vehicle. A driver's seat is provided at 120 toward the front so that the driver's view will not be obstructed by the wheels, and a gasoline tank 121 is mounted at the extreme rear to equalize the weight distribution on the wheels. An instrument box 122 is mounted on a standard 123 for ready reference.

It will be noted that the vehicle has two transmissions, arranged in series. The linkage of the transmissions is best understood from Fig. 11. Two gear shift levers are provided, 125 and 126, the first for the engine transmission and the second for the rear axle transmission. Lever 125 is mounted for sliding in a fixed support 127 as shown and is attached at 128 to a tube 129 having at its rear end an arm 130 engaging a crank 131 on a rotatable slidable shaft 132 attached to a manipulating link 133 extending into the engine gear box and adapted to shift gears in a known way. The linkage described constitutes a system whereby the conventional shifting of the gears is caused by appropriate movement of lever 125. The operation of the linkage in the various conventional gear shifting positions will be apparent from Fig. 11.

The rear axle transmission is actuated by a somewhat similar linkage. Lever 126 is pivotally attached by a sliding ball and socket joint 134 to the frame and is pivotally coupled at 135 to a rod 136 mounted at its front end, for rotation and sliding, in a fixed bearing 137 and extending back through tube 129 to the neighborhood of the rear axle. Rod 136 has at its rear end a C-shaped member 138 with a bevel gear 139 fixed solidly thereto (Fig. 7), the beveled gear engaging a similar gear 140 on a shaft 141 having an arm 142 extending into the rear axle gear box. Arm 142 (as well as 133) are simply shortened gear shift levers of known type, which on actuation change gears in a conventional manner. Rod 136 also engages a bell crank 143 which engages shaft 141. Thus by moving lever 126 forward and back, rod 136 moves forward and back and rod 141 moves sideways. By twisting lever 126 sideways (left or right) rod 136 is twisted and the twist is communicated to rod 141 through the gear.

As the transmissions are mounted in series a wide range of gear ratios is possible, in both forward and reverse motion.

Figure 7:
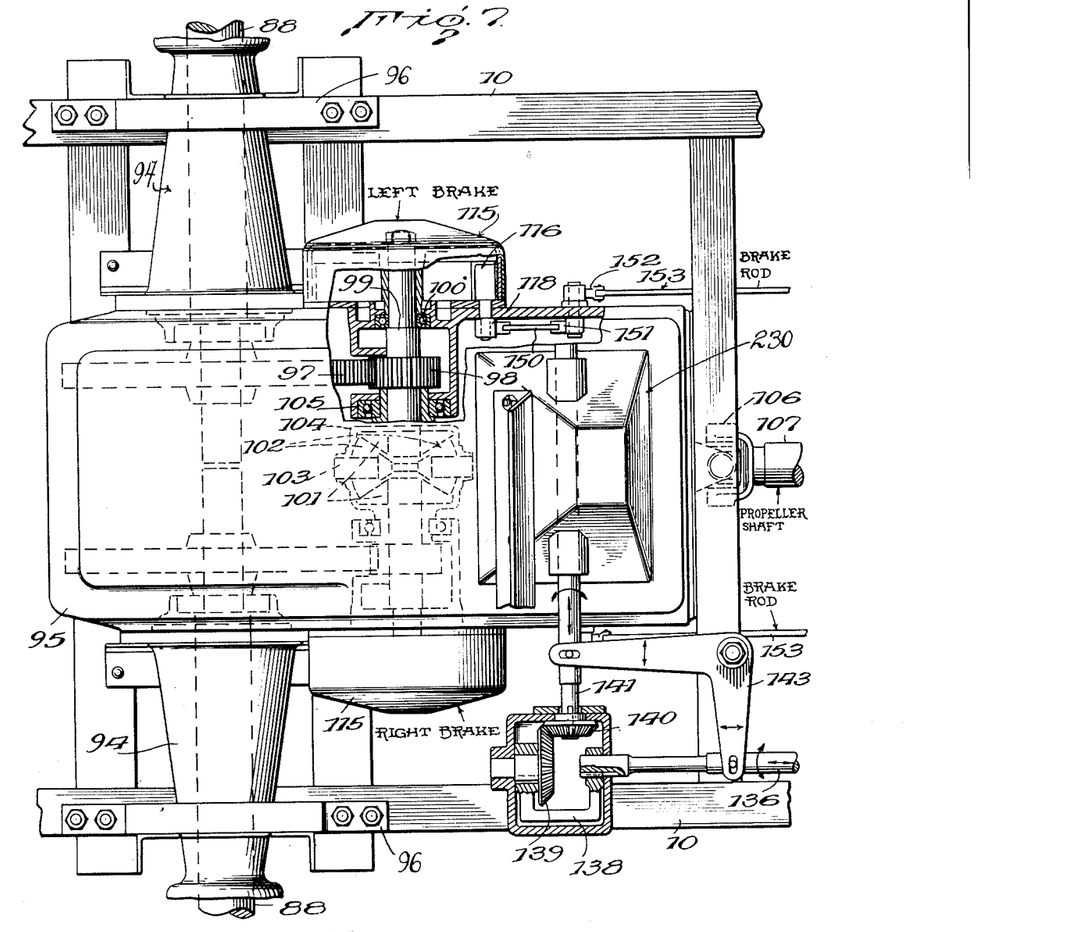
Fig. 7 is a plan view, with some parts broken away of the rear axle assembly and transmission.
Figure 8:
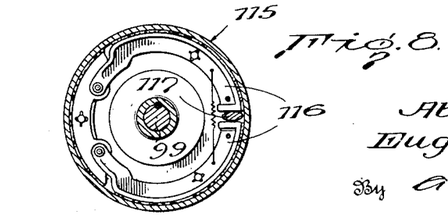
Fig. 8 is a view in vertical section of the brake of Fig. 7.
Figures 10, 11:
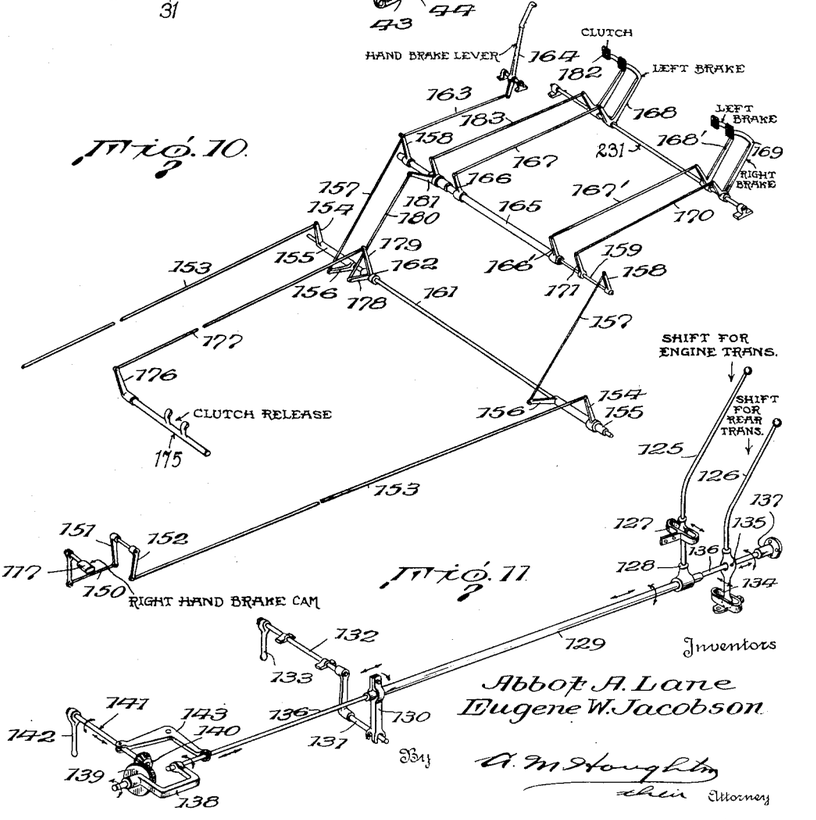
Fig. 10 is a diagrammatic showing of the clutch and brake linkage.
Fig. 11 is a diagrammatic showing of the gear shifting linkage.

Considering now the brake and clutch linkage, each cam arm 118 is pivotally attached to a link 150 on a lever arm 151 (Figs. 7 and 10). Arm 151 is reciprocated by another arm 152 extending outside the rear axle transmission housing. Arm 152 is connected by a rod 153 with an arm 154 fixed to a tube 155 having an arm 156 thereon attached to a rod 157 which is pivotally attached to an arm 158 attached to a rotary drive tube 165. The arm 158 for the left hand brake is connected to a rod 163 actuated by a hand lever 164, so that the left hand brake can be set by the hand lever. This is sufficient to hold the vehicle when standing still. The rotatable drive tube 165 has an arm 166 attached through a link 167 with a left brake pedal 168. A duplicate arm, link and pedal 166', 167' and 168' are also provided as shown. Thus by pressing either of the pedals 168 or 168', the left brake is applied. The right brake is applied independently of the left, by a pedal 169, link 170, arm 171, rod 159, right-hand arm 158, right-hand rod 157, right-hand arms 156 and 154, and right brake rod 153, all linked as shown.

By pressing on the left pedal 168, the left brake alone is set. By pressing on the right pedal 169, the right brake alone is set. By pressing on pedals 168' and 169 simultaneously, with one foot, both brakes are set. The hand brake lever is set when the vehicle is standing still.

The engine clutch, of conventional type (not shown) is actuated by the following linkage arranged as shown in Fig. 10: a clutch throwout shaft 175 has an arm 176, connected to a rod 177 attached to a crank member 162 having two crank arms 178 and 179 and free to rotate on axle 161. A link 180 connects arm 178 with a two-armed member 181 free to rotate on tube 165, member 181 being actuated by a clutch pedal 182 and link 183. The operation of the clutch linkage is clear from the diagram.

All pedals 182, 168, 168' and 169 are mounted for independent rotation on a fixed axle 231.

Figure 2:
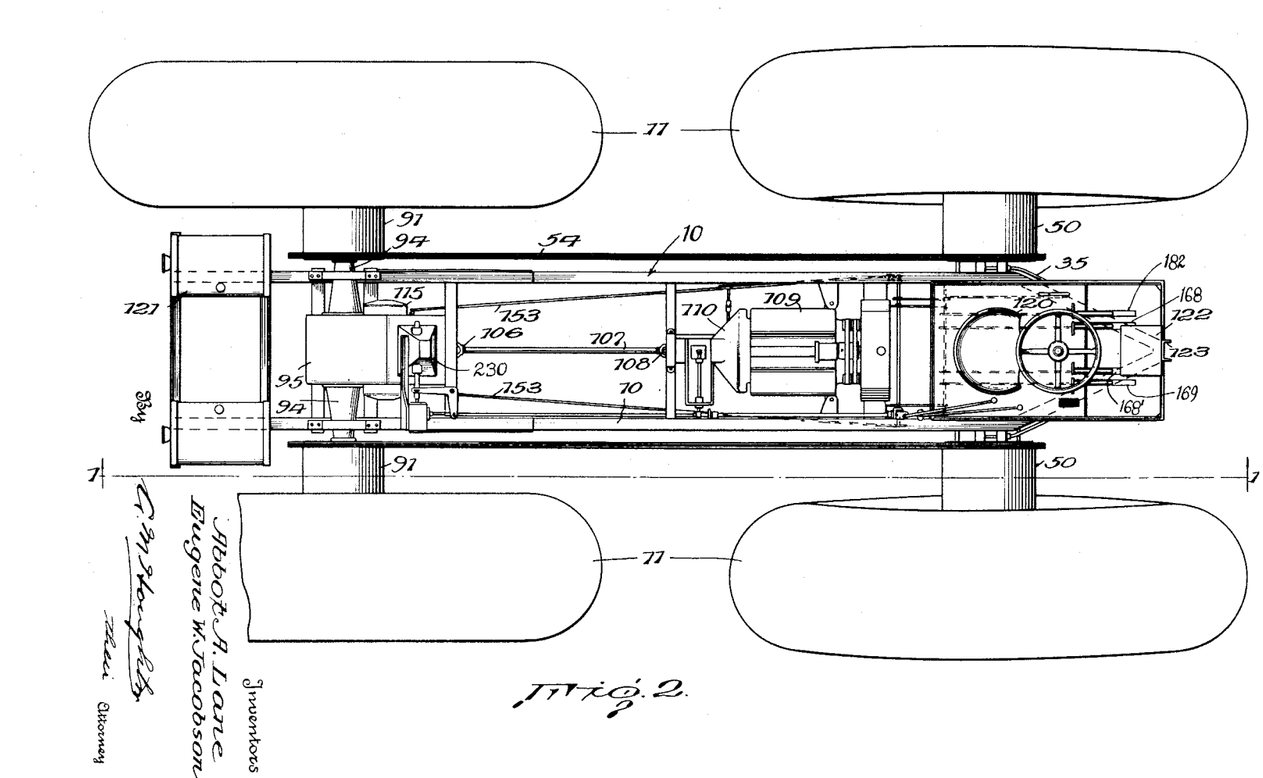
Fig. 2 is a plan view of the vehicle.

The brake and clutch linkages appear in their proper dimensions and arrangement in Fig. 2, but are more clearly followed in the diagrams of Figs. 10 and 11.

Suitable housings, bodies, etc. can be provided as desired. The weight of the vehicle with a light frame body is usually about four tons.

The engine and the controls therefor, such as spark and gas, can be of any suitable type and do not require detailed description.

Figures 13, 14:
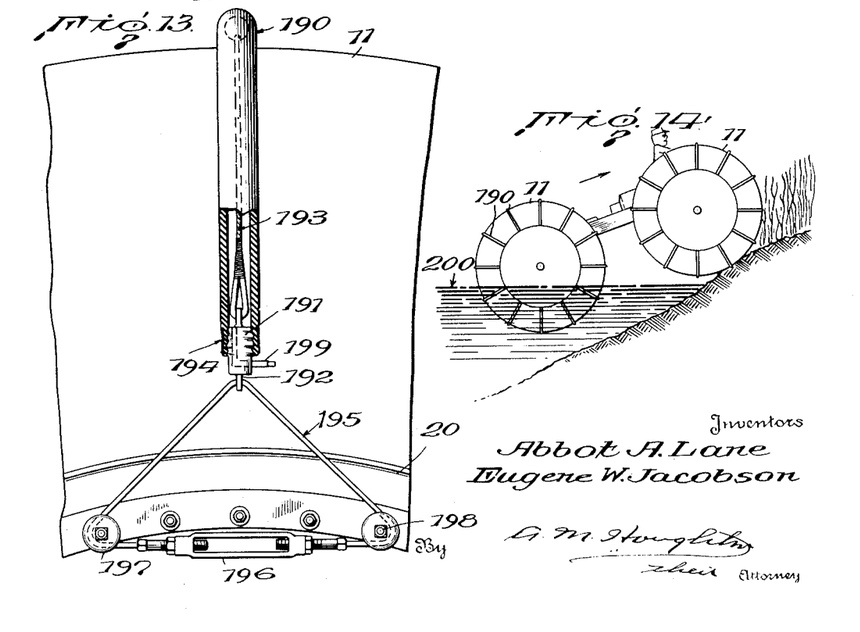
Fig. 13 is a side elevation corresponding to Fig. 12.
Fig. 14 is a view illustrating the operation of the vehicle.

In traversing water and marshes it is advantageous and in some cases quite necessary to provide the tires with substantial gripping means. Figs. 12 and 13 show a particularly good arrangement in which hollow inflatable treads are provided formed of inflated pressure hose or the like, indicated at 190. Each length of hose is closed with a corrugated plug 191 having eyes 192 at each end. The inner eyes are connected by a tie of wire or wire rope 193, to reinforce the hose. The tubes are firmly fastened to the plugs by wire wrappings 194. The tubes are retained to the wheels by ties 195 tensioned by a turn buckle 196 and passing around studs 197 bolted to the wheel as at 198. A valved nipple 199 is provided for inflating the tubes. A plurality of these tread members is provided for each of the front wheels at least, and advantageously for all wheels. The tread tubes are conveniently inflated to about 40 pounds pressure.

Because of the large size of the tires, the vehicle is cushioned sufficiently so that springs are unnecessary.

In operation, the vehicle is driven on land in a manner generally similar to the operation of ordinary trucks and automobiles. It is capable of high road speeds. For operation in water, the treads are put on and the vehicle is capable of substantial speeds though generally not as high as land speeds. The vehicle sinks in water about half way to the hubs, the water level being about as indicated at 200 in Fig. 1. We have discovered that this degree of buoyancy is best; it enables the difficult operation of coming out from water to land to be performed with ease. Fig. 14 shows this situation. As the front end of the vehicle rises, weight is drawn off the front end and towards the rear end and this effect is accentuated because the rear end tends to sink. Nevertheless, the vehicle can climb. With buoyancy relations much different from those indicated, this maneuver would be impossible. The rear end might sink so far and tip the front end up so much that no traction could be secured on the land.

The vehicle is so constructed that when loaded the center of gravity is symmetrical with respect to the wheels. That is, the center of gravity is about midway between the wheels fore and aft and sideways, and is not much above the plane of the wheels. We have discovered that this makes for a very seaworthy vehicle, whereas neglect of these considerations may result in an utterly inoperative machine.

In marshes, the vehicle sinks in to a depth depending upon the softness of the terrain, to a maximum of one-quarter the wheel diameter in the case of plain water. By virtue of the large diameter of the wheels and their close spacing fore and aft, and the swinging front axle, the vehicle can surmount logs, traverse ditches and generally go over ground which is impossible to travel by any other vehicle whatever, land or water, known to us, and quite inaccessible to men on foot. An important feature is that in traveling marshy country, no changeover procedure of any kind is necessary in going from water to land or vice versa. Even the speed of the vehicle is not substantially affected by the change in footing.

The vehicle, it will be noted, is designed for lightness throughout. Advantageously the various parts where possible are made of light alloys such as duralumin.

In open water, steering is effected by the front wheels as on land, differential braking being employed as described to facilitate this maneuver. Waves even of considerable height do not upset the vehicle. All the vital parts are well above the surface and do not tend to get splashed.

In getting out from water to land, when the banks are very steep, the best procedure is to get a good running start in the water and hit the land at high speed. Because of the largeness and softness of the tires no shock results even when the banks are steep. Ordinarily however the vehicle can climb out on land at low speeds. The vehicle described has found substantial use in actual operations in marshes and swamps.

What we claim is:

1. In an amphibian vehicle adapted to traverse the soft mud and water of marshes and force its way through the rank vegetation thereof, the combination of a frame, four buoyant wheels each having a buoyant, resilient pneumatic tire at least ten feet in diameter, means for mounting the wheels on the frame fore and aft substantially symmetrically with respect to the center of gravity of the vehicle and constructed and arranged to permit twisting of the axis of the front wheels with respect to that of the rear wheels so as to compensate for inequalities of the ground, said wheels being of such buoyancy as to support the weight of the vehicle while submerged approximately half way to the hubs, and the peripheries of the aft wheels being closely spaced from the peripheries of the fore wheels so as to facilitate passage from land to water, power means for driving all wheels and means for steering at least the fore wheels.

2. A vehicle for traversing marshes and open water comprising a frame, a pair of buoyant wheels mounted near the rear end of the frame, and a pair of buoyant wheels flexibly mounted near the front end of the frame so that the axis joining their center is capable of twisting in a vertical plane with respect to the axis joining the centers of the rear wheels, and means for driving all said wheels and for steering the front wheels.

3. A vehicle for traversing marshes and open water comprising a frame, a pair of buoyant wheels mounted near the rear end of the frame, a dead axle pivotally attached at its center to the frame adjacent the front end thereof, means for restraining rocking movement of the dead axle to a vertical plane, a pair of buoyant wheels mounted on the dead axle, means for driving all said wheels and means for steering the front wheels.

4. In a vehicle for traversing marshes and swamps, a frame, four wheels with large hollow buoyant resilient pneumatic rubber tires thereon of such size as to float the vehicle, resilient outwardly projecting means on the peripheries of the tires adapted to afford traction, a rear axle secured to the frame and arranged to carry two of said wheels, a dead front axle flexibly secured to the frame so as to permit twisting movement between the two axles in traversing uneven ground, stub axles pivotally secured to the dead axle and arranged to carry the other two wheels, an engine mounted on the frame, clutch and transmission means connecting the engine and all four wheels, means for swinging said stub axles whereby to steer the vehicle, and hand and foot operated brake means for at least two of the wheels.

5. A vehicle for traversing marshes, dry land and open water, comprising a frame, a pair of buoyant wheels mounted near the rear end of the frame, and a pair of buoyant wheels mounted near the front end of the frame, the wheels being arranged substantially symmetrically with respect to the center of gravity of the vehicle, means for supplying sufficient torque to at least two of said wheels to propel the said vehicle, and means for steering the vehicle, each of said wheels comprising a buoyant drum, and a buoyant pneumatic rubber tire carried on the drum, the combined buoyancy of the tires being sufficient to support the vehicle with the frame well above the water and the wheels submerged to a depth not substantially exceeding one-half their radii when the four wheels are in the water, and the said drums having sufficient buoyancy so that the combined buoyancies of the drums and tires on a pair of wheels will prevent the end of the vehicle adjacent said pair of wheels from sinking into the water beyond the desired depth when the wheels on the other end of the vehicle are out of water.

6. In an amphibian vehicle adapted to traverse the soft mud and water of marshes and to force its way through rank vegetation thereof, the combination of a frame, a pair of buoyant wheels mounted near the rear end of the frame, a pair of buoyant wheels flexibly mounted near the front end of the frame so that the axis joining their centers is capable of twisting in a vertical plane with respect to the axis joining the centers of the rear wheels, an internal combustion engine mounted on the frame, a transmission so constructed and arranged as to transmit power from said engine to at least two of the wheels, and means for steering at least two of the wheels; said wheels being of sufficient diameter and buoyancy to support the vehicle, while only submerging in water to a depth less than their radius with the vehicle frame well above the water line, and said engine and transmission being of sufficient capacity to propel the vehicle through soft mud and rank vegetation.

7. A vehicle for traversing marshes, dry land and open water, comprising a frame, a pair of buoyant wheels mounted near the rear end of the frame, and a pair of buoyant wheels flexibly mounted near the front end of the frame, the wheels being arranged substantially symmetrically with respect to the center of gravity of the vehicle, means for steering at least one wheel on each side of the frame so as to guide the vehicle, an engine, means operatively connected therewith for applying power to all of said wheels to propel the vehicle, and manually controlled means for adjusting the power delivered to the wheels on either side of said vehicle, whereby turning the vehicle in water is facilitated.

ABBOT A. LANE.
EUGENE W. JACOBSON.